US011525689B2

(12) United States Patent
Jansen et al.

(10) Patent No.: US 11,525,689 B2
(45) Date of Patent: Dec. 13, 2022

(54) METHOD AND DEVICES FOR PROVIDING DATA TO A DRIVER ASSISTANCE SYSTEM OF A MOTOR VEHICLE

(71) Applicant: Bayerische Motoren Werke Aktiengesellschaft, Munich (DE)

(72) Inventors: Axel Jansen, Unterschleissheim (DE); Stephan Behrendt, Planegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 348 days.

(21) Appl. No.: 16/138,489

(22) Filed: Sep. 21, 2018

(65) Prior Publication Data
US 2019/0025064 A1 Jan. 24, 2019

Related U.S. Application Data

(63) Continuation of application No. PCT/EP2017/055980, filed on Mar. 14, 2017.

(30) Foreign Application Priority Data

Mar. 23, 2016 (DE) ...................... 10 2016 204 805.8

(51) Int. Cl.
*G01C 21/32* (2006.01)
*H04W 4/44* (2018.01)
(Continued)

(52) U.S. Cl.
CPC ......... *G01C 21/32* (2013.01); *B60W 50/0098* (2013.01); *G01C 21/26* (2013.01);
(Continued)

(58) Field of Classification Search
CPC ......... B60W 2556/50; B60W 50/0098; G01C 21/26; G01C 21/32; G06F 16/29;
(Continued)

(56) References Cited

U.S. PATENT DOCUMENTS 9,117,272 B2 * 8/2015 Klebanov .............. B60Q 1/115
9,310,210 B2 4/2016 Staehlin et al.
(Continued)

FOREIGN PATENT DOCUMENTS

CN 101842662 A 9/2010
CN 101842819 A 9/2010
(Continued)

OTHER PUBLICATIONS

PCT/EP2017/055980, International Search Report dated Jun. 21, 2017 (Three (3) pages).
(Continued)

*Primary Examiner* — Tyler J Lee
(74) *Attorney, Agent, or Firm* — Crowell & Moring LLP

(57) ABSTRACT

A method for providing data for a driver assistance system of a motor vehicle includes communicating position data concerning a position of the motor vehicle to the driver assistance system, requesting additional information from a server if the driver assistance system requires additional information with respect to the position data, and communicating, in response to the requesting, the additional information from the server to the driver assistance system.

18 Claims, 3 Drawing Sheets

(51) Int. Cl.
  *G01C 21/26* (2006.01)
  *G08G 1/09* (2006.01)
  *B60W 50/00* (2006.01)
  *G06F 16/29* (2019.01)
  *G08G 1/0962* (2006.01)

(52) U.S. Cl.
  CPC ......... *G06F 16/29* (2019.01); *G08G 1/09626* (2013.01); *H04W 4/44* (2018.02); *B60W 2556/50* (2020.02)

(58) Field of Classification Search
  CPC .................. G06Q 10/06; G06Q 10/063; G06Q 10/06375; G06Q 30/0201; G06Q 40/08; G08G 1/09626; H04W 4/44
  See application file for complete search history.

(56) References Cited

U.S. PATENT DOCUMENTS

| | | | | | |
|---|---|---|---|---|---|
| 2003/0125871 | A1* | 7/2003 | Cherveny | ............ | G08G 1/0969 701/409 |
| 2005/0273257 | A1* | 12/2005 | Hager | .................. | G01C 21/005 701/500 |
| 2007/0250263 | A1* | 10/2007 | Yamada | ................. | B60Q 1/085 701/408 |
| 2007/0299606 | A1* | 12/2007 | Fujimoto | .................. | B60T 7/22 701/450 |
| 2009/0299625 | A1 | 12/2009 | Denaro | | |
| 2012/0027221 | A1 | 2/2012 | Davis | | |
| 2015/0345971 | A1* | 12/2015 | Meuleau | .............. | G05D 1/0217 701/25 |
| 2016/0209848 | A1* | 7/2016 | Kojo | ..................... | G05D 1/0088 |
| 2016/0223345 | A1* | 8/2016 | Thakur | ................. | G08G 1/0137 |
| 2016/0225255 | A1* | 8/2016 | Thakur | ................... | G01C 21/32 |
| 2016/0231750 | A1* | 8/2016 | Kawamata | ............. | G06Q 10/08 |
| 2016/0265922 | A1* | 9/2016 | Thakur | ................. | G05D 1/0212 |
| 2019/0041523 | A1* | 2/2019 | Muramatsu | ............. | G01S 17/86 |

FOREIGN PATENT DOCUMENTS

| | | |
|---|---|---|
| CN | 103192834 A | 7/2013 |
| CN | 104583042 A | 4/2015 |
| CN | 105321362 A | 2/2016 |
| DE | 10 2008 053 531 A1 | 5/2009 |
| DE | 10 2010 034 140 A1 | 2/2012 |
| DE | 10 2011 083 399 A1 | 3/2013 |
| DE | 10 2013 210 928 A1 | 12/2014 |
| WO | WO 2009/027173 A1 | 3/2009 |
| WO | WO 2009/056533 A1 | 5/2009 |

OTHER PUBLICATIONS

German Search Report issued in German counterpart application No. 10 2016 204 805.8 dated Feb. 6, 2017, with Statement of Relevancy (Nine (9) pages).

Chinese Office Action issued in Chinese application No. 201780018962.1 dated Jun. 28, 2021, with English translation (Seventeen (17) pages).

Chinese Office Action issued in Chinese application No. 201780018962.1 dated Jan. 7, 2022, with partial English translation (Thirteen (13) pages).

* cited by examiner

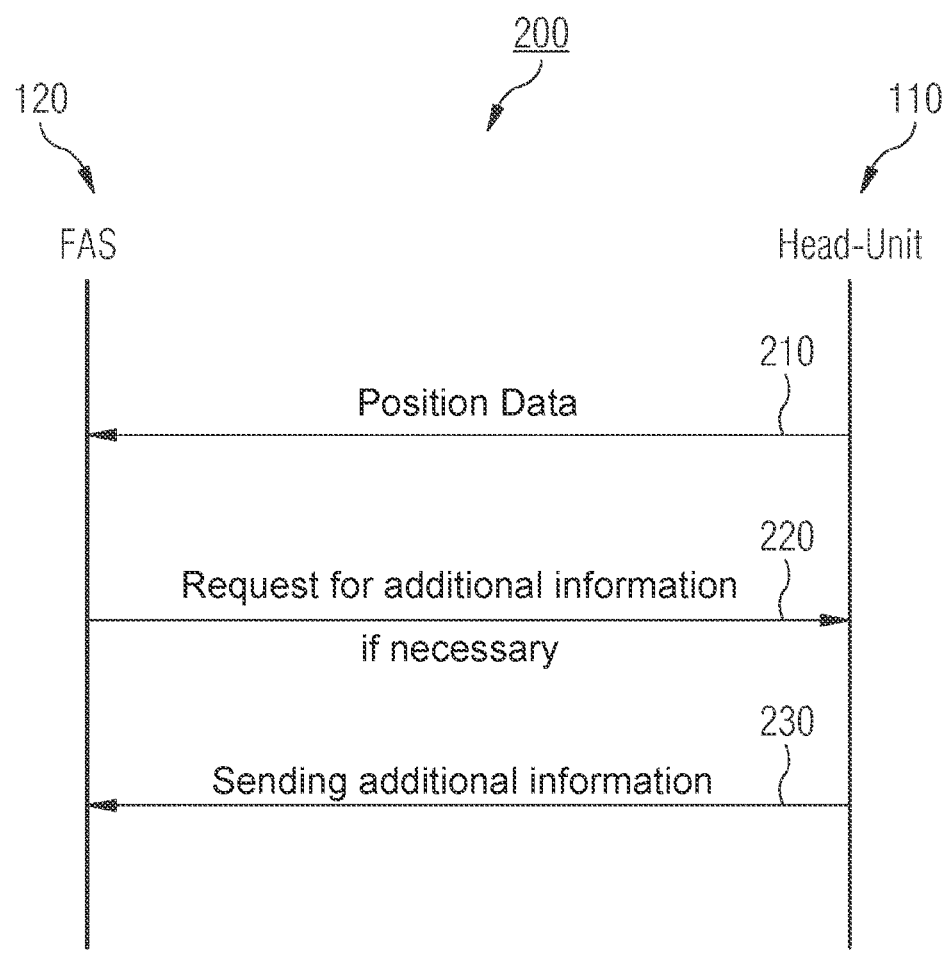

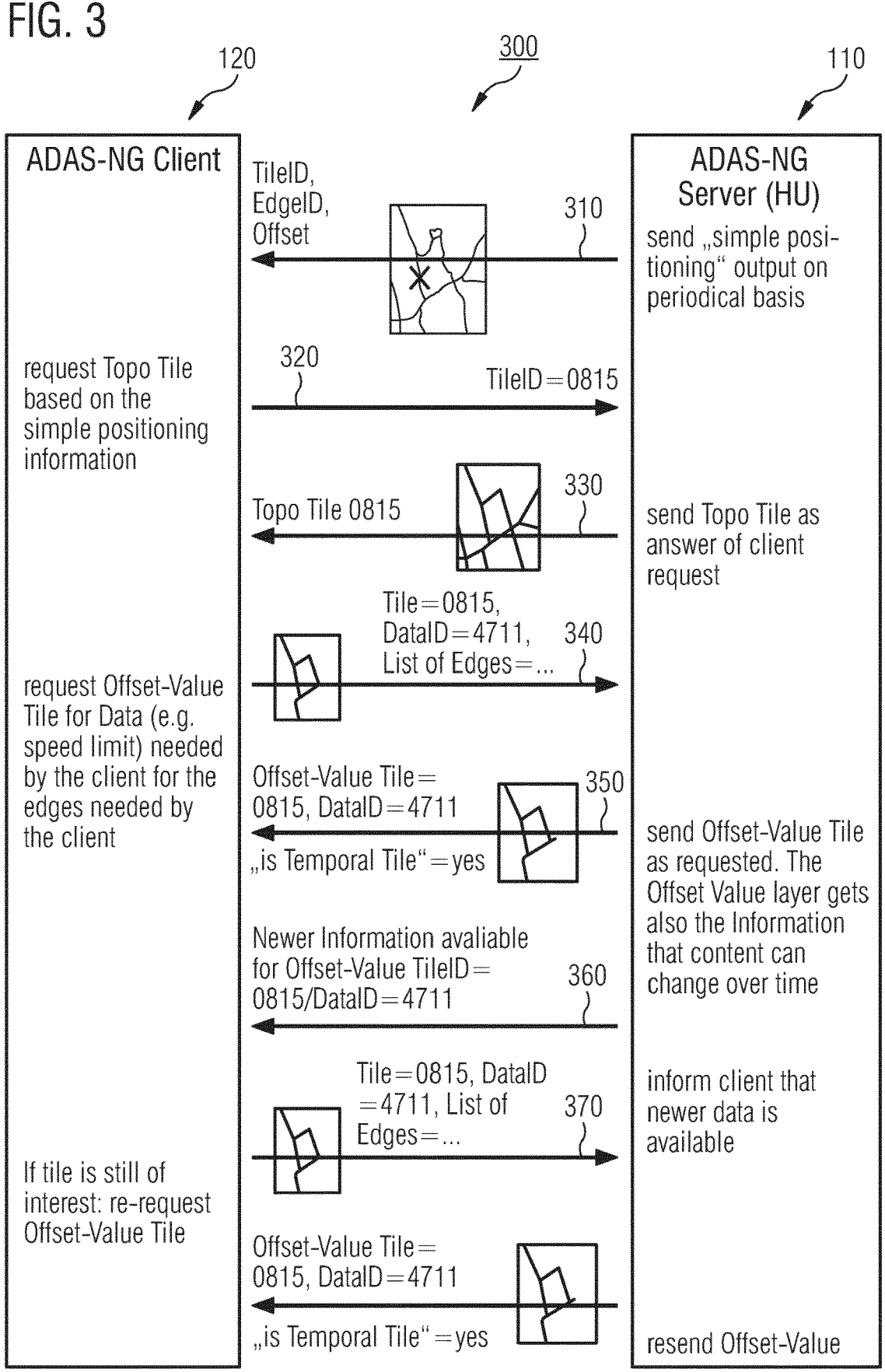

METHOD AND DEVICES FOR PROVIDING DATA TO A DRIVER ASSISTANCE SYSTEM OF A MOTOR VEHICLE

CROSS REFERENCE TO RELATED APPLICATIONS

This application is a continuation of PCT International Application No. PCT/EP2017/055980, filed Mar. 14, 2017, which claims priority under 35 U.S.C. § 119 from German Patent Application No. 10 2016 204 805.8, filed Mar. 23, 2016, the entire disclosures of which are herein expressly incorporated by reference.

BACKGROUND AND SUMMARY OF THE INVENTION

The present invention relates generally to methods and devices for providing data, in particular map-based or georeferenced data, for a driver assistance system of a motor vehicle, and in particular for providing data for an electronic horizon of a motor vehicle.

A navigation system can also serve as a sensor for other driver assistance systems (called Advanced Driver Assistance Systems, ADAS) of a vehicle in order to improve or extend the functional scope thereof. In this case, driver assistance systems are understood to be electronic ancillary devices in motor vehicles for assisting the driver in specific driving situations. Safety aspects, but increasing the driving convenience, too, are often of primary importance here. A further aspect is improving economy. In order to support the driver assistance systems, location-related information can be communicated from a navigation system or a so-called head unit, also referred to hereinafter as main unit, of an infotainment system to one or more other controllers of driver assistance functions in the vehicle. The head unit functions here as it were as a server, while the individual controllers or driver assistance systems act as clients. The location-related information communicated is often also referred to in the technical jargon as electronic horizon.

Systems for generating an electronic horizon on the basis of digital road maps are known. These systems use various protocols for distributing the information in the vehicle network such as, for example, ADASIS v2, ADASIS v3 and BMW ADAS 2.1. The CAN bus (CAN=Controller Area Network) is typically employed as a communication channel in this context. The protocols are based on an extracted navigation graph in the form of one or more paths (ADASIS v2 and v3) or a tree (ADAS 2.1). A navigation graph is used as a reference system for a corresponding attributing and hence information distribution. Attributes of a digital road map can be understood hereinafter to be features and/or properties of said features. Features are possibilities—suitably taken into account in the digital road map—for local manifestations of real roads or other objects, such as, for example, road classes, speed restrictions or traffic signs. These features have specific properties depending on location.

In this case, the decision as to which elements (on the basis of topological links or segments) from a digital navigation map will be concomitantly included in the electronic horizon is usually incumbent on the head unit. It can use various algorithms to determine a travel path that will most probably be traveled (also referred to as MPP=Most Probable Path) and explore the map in this direction. Afterward, depending on the strategy used, corresponding side streets can be explored. In other words, the electronic horizon can include information on the road network ahead (topology), wherein only the roads which can be reached from the current position of the vehicle and which will also actually be traveled with a certain probability are relevant.

In this case, the length of the corresponding electronic horizon is influenced by various factors such as, for example, the density of the information in the respective area or the coding used in the format. A preview length of the electronic horizon is typically about 500 m to 6 km, depending on requirements of the driver assistance systems using the electronic horizon.

Since different driver assistance functions in the vehicle require different preview regions, the electronic horizon can have different manifestations. For example a 2D manifestation, which also contains corresponding branchings besides the most probable travel path, or a 1D preview, which follows only the most probable travel path or generally the course of a planned route. In this regard, different driver assistance functions can be supplied with a varying degree of information.

Even now the abovementioned currently available driver assistance or ADAS protocols for the transmission of the electronic horizon are reaching limits in respect of transmission possibility. The extent or preview length of the preview region is restricted by the density of location-related attributes present (such as e.g. speed restrictions, gradients, curvatures, etc.). New attributes/features cannot be added since the messages or protocols in general can no longer be supplemented by new fields. Transmission of highly accurate map data for future driver assistance systems, such as, for example, an exact lane model including the underlying geometry, is not possible with current ADAS protocols on the basis of CAN. Increasing the bandwidth by changing the underlying layer, e.g. changing from CAN to Ethernet, is of only limited help in the face of these challenges since even coding formats that are used in the ADAS protocols are not intended for this type of information. The ADASIS v3 protocol, for example, pursues this solution approach. However, this, too, again involves taking individual paths as a segment from the navigation map.

A further disadvantage of the currently known ADAS protocols and implementations is the fact that the head unit as source of navigation-based information carries out the calculation of the most probable travel path. As a result, all connected driver assistance functions have to work with this most probable travel path. However, different driver assistance functions may prefer different manifestations of the most probable travel path. By way of example, one driver assistance function might want always to follow the course of the road and always attempt to ascend to the next higher road class (e.g. a change from ordinary road to interstate highway), while other driver assistance functions prefer to travel straight on. This can have the effect that the electronic horizon lacks information required by the driver assistance function since said information has already been filtered out by the head unit.

By virtue of the fixedly structured protocols of the current manifestations of the electronic horizon, all required information must already be stipulated and defined in the form of attributes at the time of the conception of the respective protocol. A subsequent extension by additional attributes is generally associated with new development work and corresponding costs. As a result, current manifestations of the electronic horizon are very rigid and cannot react flexibly to new requirements of future driver assistance functions, such as, for example, highly automated driving.

The networking between current and primarily future vehicles with corresponding backend services is constantly increasing. Map information can be updated ever more rapidly as a result. Beginning with updating of the topology of the corresponding map through to highly dynamic updating of traffic states and currently displayed values of changeable message signs. These highly dynamic data likewise cannot be transmitted with the aid of current manifestations of the electronic horizon in the vehicle.

The various driver assistance functions in the vehicle make different requirements of the manifestation of the represented information from the digital map. Some driver assistance functions require very detailed information both at the current position and along the entire road network (topology) ahead of the vehicle. Other driver assistance functions only require individual attributes concerning the topology and/or concerning the current vehicle position (e.g. the maximum speed currently allowed). The various available manifestations of the electronic horizon cannot adapt flexibly to these requirements at the present time. All functions have to agree on uniform interfaces and thus cope with in some instances too much or too little information.

Consequently, it can be deemed to be an object of the present invention to develop and to improve the previously known prior art concerning the provision of map-based data in a motor vehicle.

That is taken into account by methods and devices having the features of the independent patent claims. The dependent claims relate to advantageous configurations and developments.

In accordance with a first aspect, exemplary embodiments of the present invention provide a method for providing data, in particular map-based or georeferenced data, for a driver assistance system of a motor vehicle. The method comprises indirectly or directly communicating position data concerning a current or future position of the motor vehicle e.g. from a vehicle-internal or vehicle-external positioning and/or navigation unit to the driver assistance system. If the driver assistance system requires additional information with respect to the position data, it requests the additional information from a vehicle-internal or vehicle-external server. Requirement-controlled requests must take place—no requirement, no request; if required, request. In reaction to the requesting, the vehicle-internal or vehicle-external server communicates the additional information indirectly or directly to the driver assistance system.

Provision of navigation data at different levels is thus proposed. Position data (if appropriate with respect to the current position) are regularly communicated as a type of basic information to the driver assistance system by the positioning or navigation unit. Communicating the position data with the current vehicle position can thus be regarded as a fundamental or necessary communication. Only if required does the driver assistance system or the assigned controller thereof request further data related to the position data or the current vehicle position, such as, for example, attributes of the current vehicle position or further topological data with respect to the current vehicle position. The additional information can also be georeferenced volatile data: for example weather, traffic flow, etc. Exemplary embodiments can be used for example advantageously for the scalable provision of map-based data for an electronic horizon.

The navigation unit can be an infotainment or a navigation head unit fixedly installed in the vehicle. However, exemplary embodiments are also conceivable in which a positioning or navigation system that is not fixedly installed in the vehicle can be used as navigation unit, such as e.g. a smartphone or the like. The navigation unit can thus be configured to provide at least current and/or future position data. A simple position transmitter without more extensive functionalities can thus also be involved. However, the navigation unit can optionally also have more complex functions, such as e.g. route calculation and/or provision of further map-based attributes. The server can likewise be the infotainment or navigation head unit (main unit) installed in the vehicle. However, vehicle-external servers (e.g. Internet) are likewise conceivable as well.

In some exemplary embodiments, position data can be understood to be coordinates of a current vehicle position. However, position data can comprise future position data or coordinates along a planned route or a path deemed likely to be followed. A current or future position of the vehicle (Current Car Position, CPP) can be described with various degrees of detail, such as, for example, the real position in WGS84 coordinates (World Geodetic System 1984), that is to say e.g. a raw position based on GPS and vehicle odometry. A further possibility is for example an indication of a map segment (e.g. map tile, tile ID) in which the current vehicle position is situated. In addition thereto, it is possible to indicate a topology element of said map segment, such as e.g. a node or an edge (link ID), at which the vehicle is currently situated. In order to identify the current vehicle position even more accurately in the map segment, a so-called offset value can additionally be indicated as well, which designates where on the topology element the vehicle is currently situated. It goes without saying that other formats are likewise possible and dependent on their usability in the receiving controller.

The position data represent basic information of the requirement-controlled data provision presented here, which basic information is at least provided to the driver assistance system by the positioning or navigation unit. Said position data could also be understood as a type of basic layer of the proposed protocol. By contrast, the additional information can be understood as a requirement-controlled additional layer of the protocol.

In some embodiments, communicating the position data can be carried out periodically or cyclically, e.g. after the driver assistance system has registered itself at the positioning or navigation unit. Instead of traditional push messages, therefore, here the proposed ADAS protocol can distinguish between the variants: cyclic transmission of the current position data and requirement-controlled request/response with regard to the additional (map-based) information. The cyclic transmission can be used to supply the receiver cyclically with relevant data requested by the receiver. This can include exclusively the transmission of the current position in the case of the proposed ADAS protocol. Optionally, a selection of map attributes which are applicable at the current position can additionally be communicated cyclically. Attributes at the current position can be attributes describable by configurable data formats, so-called data definitions (data format descriptions). These include for example: the number of lanes, the road class, name of the road, speed limit, gradient values, etc.).

Besides regularly communicating the position data, requesting the additional information in a requirement-controlled manner can in some embodiments comprise requesting map information of a digital road map, said map information being associated with the position data. In other words, the driver assistance system client furthermore has the possibility of directly requesting map information via a request/response interface. In this case, the map information can comprise attributes and/or topological information associated with the position data, that is to say location-related attributes and/or location-related topological information, which are/is communicated from the server (that is to say e.g. from the main unit) to the driver assistance system on request rather than on a regular basis. An attribute of a digital road map is understood here to be features and/or properties of these features. Features are possibilities—suitably taken into account in the digital road map—for local manifestations of real roads, such as, for example, road classes, traffic signs, speed restrictions, curve radii, state of roadway, etc. These features have specific properties depending on location. By contrast, topological information or data denote a road network structure and in this case can describe e.g. turning restrictions at intersections. Topological information can be understood to be for example nodes and edges in a road network graph, that is to say a connection between two decision points (e.g. intersection) in the graph.

The topology of the road network represents a basis of the map information. This topology can be stored in digital road maps in the form of the graph. At the elements (edges and nodes) of this graph it is then possible to store arbitrary information in the form of attributes. In some embodiments of the proposed ADAS protocol, the topology can be decoupled from the attributes. That is to say that for map requests that go beyond the current position, the driver assistance system client, by means of various methods, can interrogate the topology and subsequently interrogate the required information in the form of attributes with respect to these topology elements.

In some embodiments, requesting the additional information in a requirement-controlled manner can thus firstly comprise requesting topological data associated with the position data. In such cases, communicating the additional information can comprise communicating topological data from map tiles of a digital road map that are associated with the position data. This allows the driver assistance system to be supplied with topological data all around the position data in a requirement-conforming manner. Thus, in response to a request, depending on requirement, one or more topological elements (nodes, edges, etc.) can be communicated to the driver assistance system. Predefined amounts of topological data to be communicated are not provided. The client can interrogate either only the road section currently being traveled (in the form of the current link and knowledge about the associated links) or a larger segment from the topology. This segment can be based on a defined tile scheme, e.g. the NDS tile scheme at level 13.

If the client can obtain the topology information, the client can interrogate arbitrary attributes for arbitrary elements within this topology. After obtaining the topological data, therefore, if required, the driver assistance system can also request attributes associated with the topological data from the vehicle-internal or -external server. In some exemplary embodiments, therefore, requesting the additional information can also comprise requesting at least one attribute associated with the topological data. In reaction to the requesting, the at least one attribute can be communicated from the server to the driver assistance system. Here, too, requirement-controlled requesting of attributes thus take place, such that the communication thereof takes place only if the driver assistance system requires or would like the attributes. Transmission resources can thus be used efficiently and in a requirement-conforming manner.

In some exemplary embodiments, requesting topological data and/or attributes in a requirement-controlled manner can also be tantamount to a subscription for the requested topological data and/or attributes by the driver assistance system for the future. In embodiments of this type, therefore, a request can already suffice to indicate to the server requirement of the respective data, such that the server can communicate these data to the driver assistance system "without being asked" in the future, e.g. periodically or upon attributes changing.

For the interrogation of the map attributes, some exemplary embodiments propose a mechanism which allows at an early stage at the protocol level accurate description of how information will be transmitted, but allows the description of the transmitted data at a later point in time. With the aid of data definitions already mentioned above, it is possible to stipulate that arbitrary information in the form of primitive data types (such as, for example, field of integer) can be located at a topology element or the CCP. The meaning of the data types can be defined via the description of the data definitions. Updated data definitions can be provided for the head unit from time to time in order to be able to react to new driver assistance systems. Each data definition can be assigned a unique ID, which can be part of the ADAS protocol. With the aid of the ID, the corresponding data definition can be identified and a meaning can be assigned to the primitive data types. In accordance with some exemplary embodiments, communicating the at least one attribute can thus be carried out in a data format (date definition) adapted to the attribute. In this case, the data format can comprise a unique identification of the data format and a description of data types contained in the data format.

The navigation environment contains a multiplicity of data which can often change, such as, for example, changeable message signs or the traffic flow. These data are deemed to be among the volatile or dynamic data. In the proposed ADAS protocol, these data can likewise be packaged in data definitions and additionally also acquire the classification as dynamic data and a corresponding lifetime. In other words, the at least one attribute can thus comprise a variable attribute. In some exemplary embodiments, the description of the data types contained in the data format can comprise an identification of a variable attribute and a validity duration assigned to the latter.

In different implementations of the protocol, the variable attributes can then be treated separately. In one example, the client can interrogate new data after the lifetime or validity duration has expired. In other words, requesting at least one attribute can thus comprise re-requesting the attribute after the validity duration thereof has expired. Additionally or alternatively, the client can be informed separately if dynamic data that had already been interrogated have changed. The client can then decide whether to retrieve these data again. In some embodiments, the method can thus comprise a step of informing the driver assistance system about a changed attribute. If the client does not retrieve these data again, said client also need no longer be informed about further changes in said data in the future.

In some exemplary embodiments, communicating the position data and the additional information is carried out via a vehicle-internal bus system. Possible bus systems are, for example, field buses such as CAN, FlexRay or Local Interconnect Network (LIN). Further exemplary embodiments additionally or alternatively also allow the data to be communicated via Ethernet or further Local Area Network (LAN) technologies.

In accordance with a further aspect, exemplary embodiments provide a system for providing data for a driver assistance system of a motor vehicle. The system can comprise a positioning or navigation unit (e.g. head unit, driver assistance system server) configured to communicate position data concerning a position of the motor vehicle to a driver assistance system (or controller assigned thereto). The system furthermore comprises a driver assistance system (or controller assigned thereto) configured to receive position data and, if additional information with respect to the position data is required, to request the additional information from a vehicle-internal or -external server. The server is configured, in reaction to the request, to communicate the requested additional information to the driver assistance system.

In accordance with a further aspect, a driver assistance system (or controller assigned thereto) is provided which is configured to receive position data concerning a position of the motor vehicle from a positioning or navigation unit and, if additional information with respect to the position data is required, to request the additional information from the navigation unit or a server, in particular a vehicle-internal main unit.

In accordance with an additional aspect, a server, in particular a vehicle-internal main unit, is also provided. The server is configured to communicate position data concerning a position of a motor vehicle to a driver assistance system and, in reaction to a request from the driver assistance system, to communicate additional information with respect to the position data to the driver assistance system.

The proposed requirement-controlled division of the ADAS protocol allows major scaling effects: a simple driver assistance function requiring only information at the current position need only evaluate the current CCP information, while a complex driver assistance function, by contrast, via the interrogation of the topology and the corresponding data definitions, can interrogate arbitrary complex information through to highly accurate lane models.

The division into topology and attributes likewise enables major scaling effects: the client can itself decide what detailed information to request and to what extent. In general, the client can run on a weaker controller than the server and hence also have less memory. The client can thus make its requests depending on available memory and required information content. As a result, the client itself can decide how much information it has to process and when. In traditional ADAS protocols, this is defined from the outset and cannot be adapted subsequently. As a result, by means of traditional ADAS protocols, for example, highly accurate lane models can be transmitted only with relatively great interventions.

The proposed protocol is living and can react agilely to changes since, at the time of the definition of the protocol in the form of a data format to be transmitted, it is not yet necessary to stipulate what information will be transmitted. In this regard, it is possible to add new information also regarding the lifetime of the protocol in the form of new data definitions. Existing clients cannot evaluate this information, under certain circumstances, but will not interrogate this information either. New clients know the new data definitions and can then process them.

By means of the proposed methods, the protocol can handle dynamic information very efficiently. Traditional protocols do not allow dynamic information since information, once transmitted, can no longer be changed. That is to say that here everything new would have to be transmitted, while in the case of the proposed protocol individual items of information can also be transmitted anew once the client has been informed about the updating.

Some exemplary embodiments of the present invention are explained in greater detail below with reference to the accompanying figures, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a sequence of a data exchange between a head unit and the driver assistance system.

FIG. 3 shows one example of a possible transmission between client and server in accordance with one exemplary embodiment.

DETAILED DESCRIPTION OF THE DRAWINGS

Figure 1:
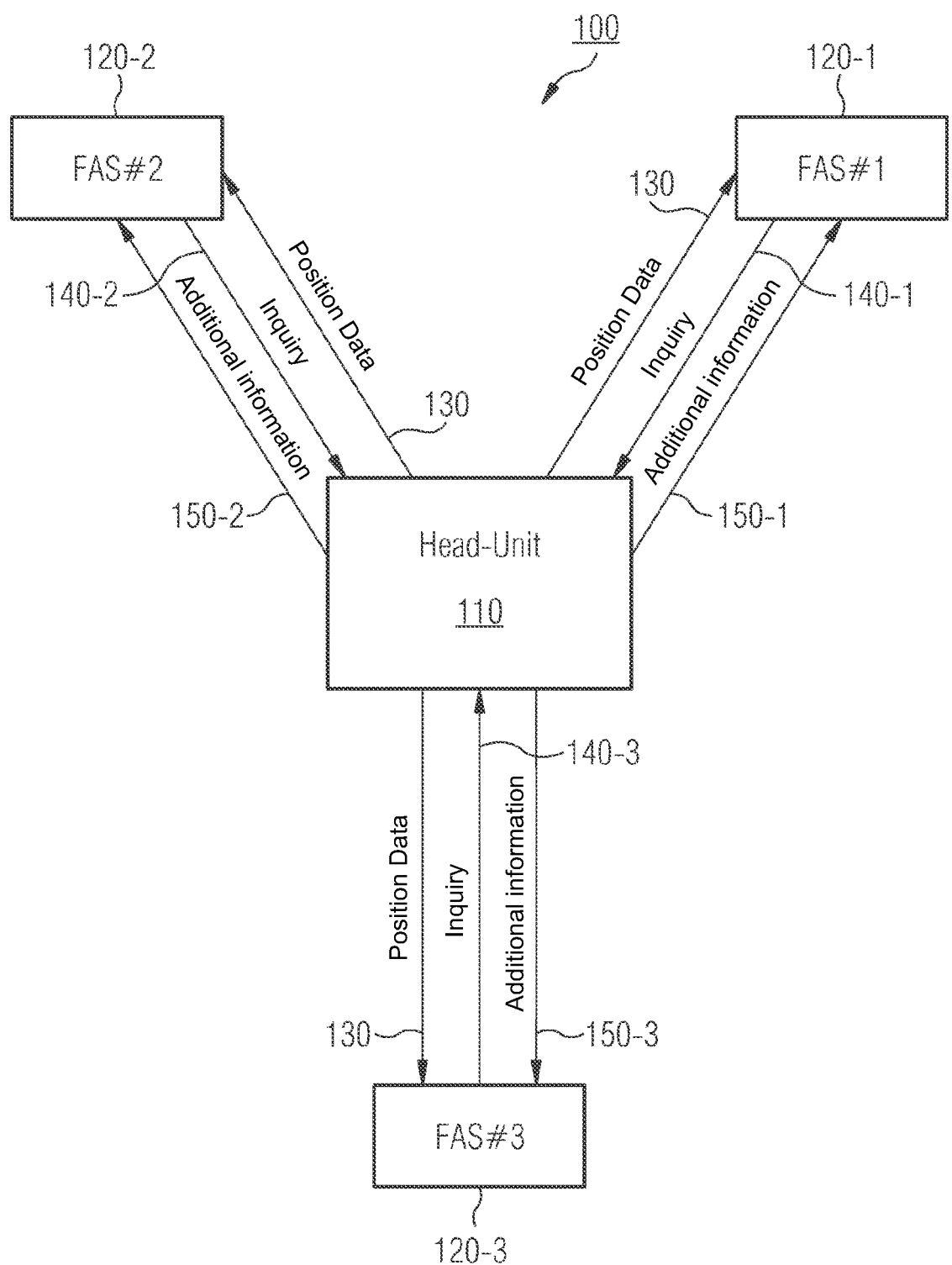
FIG. 1 shows a schematic illustration of an exemplary system for providing data for a driver assistance system for a motor vehicle.

Various exemplary embodiments will now be described more thoroughly with reference to the accompanying drawings illustrating some exemplary embodiments.

In the following description of the accompanying figures, which show only a few exemplary embodiments by way of example, identical reference signs may designate identical or comparable components. Furthermore, summarizing reference signs may be used for components and objects which occur multiply in an exemplary embodiment or in a drawing but are described jointly with regard to one or more features. Components or objects which are described with identical or summarizing reference signs may be embodied identically, but if appropriate also differently, with regard to individual, a plurality or all of the features, for example their dimensionings, provided that the description does not explicitly or implicitly reveal something to the contrary.

Although exemplary embodiments may be modified and altered in various ways, exemplary embodiments in the figures are illustrated as examples and are described thoroughly herein. It should be clarified, however, that the intention is not to restrict exemplary embodiments to the forms respectively disclosed, rather that exemplary embodiments are intended to cover all functional and/or structural modifications, equivalents and alternatives which lie within the scope of the invention. Identical reference signs designate identical or similar elements throughout the description of the figures.

It should be noted that one element which is designated as "connected" or "coupled" to another element may be directly connected or coupled to the other element or intervening elements may be present. By contrast, if one element is designated as "directly connected" or "directly coupled" to another element, no intervening elements are present. Other terms used to describe the relationship between elements should be interpreted in a similar way (e.g. "between" vis-à-vis "directly therebetween", "adjacent" vis-à-vis "directly adjacent", etc.).

The terminology used herein serves only to describe specific exemplary embodiments, and is not intended to restrict the exemplary embodiments. As used herein, the singular forms "a", "an" and "the" are also intended to include the plural forms as long as the context does not unambiguously indicate something to the contrary. Furthermore, it should be clarified that the expressions such as e.g. "includes", "including", "comprises" and/or "comprising", as used herein, indicate the presence of stated features, whole numbers, steps, work sequences, elements and/or components, but do not exclude the presence or the addition of one or more features, whole numbers, steps, work sequences, elements, components and/or groups thereof.

FIG. 1 shows a schematic illustration of an exemplary system 100 for providing data for a driver assistance system of a motor vehicle, in particular for providing data for an electronic horizon.

The system 100 comprises a vehicle-internal head unit 110 as a server and, coupled thereto, some driver assistance systems 120-1, 120-2, 120-3 or controllers assigned thereto as clients. The head unit 110 can be assigned for example to an infotainment system of the motor vehicle. It can integrate functions from consumer electronics, Internet technology, operation of convenience features, and navigation. The various driver assistance systems 120-1, 120-2, 120-3 can be coupled to the head unit 110 for example via a vehicle-internal data bus, such as e.g. the CAN bus. In some exemplary embodiments, the driver assistance systems 120-1, 120-2, 120-3 can enable at least partly autonomous driving of the motor vehicle or assist the driver.

To that end, the head unit 110 communicates regularly, e.g. periodically or cyclically, current vehicle position data 130 to the connected driver assistance systems 120-1, 120-2, 120-3. The vehicle position data represent as it were a minimum amount of information that is transmitted between the head unit 110 and the driver assistance systems 120-1, 120-2, 120-3. It should be mentioned that the vehicle position data (current and future) can also come from some other suitable navigation unit, which need not necessarily be fixedly installed in the vehicle.

Depending on functionality, the driver assistance systems 120-1, 120-2, 120-3 can have a varying requirement for additional information with respect to the current vehicle position data, wherein the additional information can be map information of a digital road map, said map information being associated with the position data (that is to say location-related). Therefore, in the exemplary embodiment, the driver assistance systems 120-1, 120-2, 120-3 are each configured, if there is a respective requirement for additional information with respect to the position data, to request the additional information respectively required from the head unit 110. In other embodiments, the additional information could additionally or alternatively be requested from a vehicle-external server. The additional information is generally required not only at the vehicle position, but also in the vehicle environment, e.g. along a planned route or a path that is deemed likely to be followed. Besides position data, information regarding the planned route or the like may thus also be crucial for further requests. The corresponding requests are designated by 140-1, 140-2 and 140-3 in FIG. 1. As a reaction to the respective requests 140-1, 140-2 and 140-3 the head unit 110 communicates the additional information 150-1, 150-2, 150-3 respectively requested to the respective driver assistance system 120-1, 120-2, 120-3. A requirement-controlled or requirement-conforming exchange of individually required additional information, such as e.g. map-based data, thus takes place in each case between the driver assistance systems 120-1, 120-2, 120-3 and the head unit. Each driver assistance system 120-1, 120-2, 120-3 can thus be individually supplied with different additional information.

While the information 150-1 of the first driver assistance system 120-1 that is required in addition to the position data can concern, for example, one or more map attributes (e.g. permissible maximum speed) which are applicable at the current position, the information 150-2 of the second driver assistance system 120-2 that is required in addition to the position data can comprise for example topological data, e.g. road network elements, with respect to the position data. The third driver assistance system 120-3 can be interested for example both in additional topological data and in attributes concerning the topological data as information 150-3 required in addition to the position data and can thus have the highest individual data requirement. The driver assistance system 120-3 can implement for example a more complex driver assistance function having a higher data requirement (e.g. an adaptive cruise control system).

A basic sequence of a data exchange between the head unit 110 and of the driver assistance systems 120-1, 120-2, 120-3 is illustrated in the schematic message sequence chart (MSC) 200 in FIG. 2.

Firstly, in a step 210, position data concerning a current position of the motor vehicle are communicated from the head unit 110 to the driver assistance system (DAS) 120. If required, in a step 220, the driver assistance system (DAS) requests additional information (such as e.g. attributes and/or topological data) with respect to the position data from the head unit. In a step 230, the head unit 110 then sends the requested or required additional information to the driver assistance system (DAS).

Now that a communication between head unit 110 and driver assistance system (DAS) has been schematically outlined in comparatively general terms with reference to FIG. 2, a more concrete exemplary embodiment will now be described with reference to FIG. 3. FIG. 3 illustrates a possible communication between driver assistance system (ADAS client) 120 and head unit (server) 110 in one exemplary embodiment of the proposed protocol.

Here after logging on at the server 110, the client 120 is supplied with the current vehicle position cyclically by means of messages 310. In the example illustrated, the current vehicle position is transferred to the client 120 in the form of a tile ID (TileID), a link ID (EdgeID) and an offset on the link. In this case, the tile ID designates a map segment in which the current vehicle position is situated. The link ID designates a topological element within this map segment, such as e.g. a node or an edge, at which the vehicle is currently situated. The offset designates where exactly on the topological element the vehicle is currently situated.

On the basis of this basic information 310, the client 120 can interrogate additionally required topology information, see step 320. In the example shown here, on the basis of the simple position information 310, a topology tile having an exemplary tile ID 0815 is requested from the head unit 110, and is actually communicated to the client 120 in a subsequent step 330.

Depending on the information requirement, the client 120 subsequently in a step 340 can interrogate further map attributes required with respect to the topology tile 0815, such as e.g. the permissible maximum speed concerning one or more edges (e.g. roads) of the topology tile. To that end, the client 120 can send to the head unit 110 a data ID (here: DataID=4711) describing the desired map attributes or data definition. With the aid of the data ID, the corresponding data definition can be identified and a significance can be assigned to primitive data types.

In a subsequent step 350, the head unit 110 sends the requested attributes corresponding to the DataID=4711 in a data format determined by the corresponding data definition to the client 120. In accordance with some exemplary embodiments, communicating the at least one attribute can thus be carried out in a data format (data definition) adapted to the attribute. In this case, the data format can comprise a unique identification of the data format or of the attribute and a description of data types contained in the data format.

In accordance with the examples shown, the attributes communicated by the head unit 110 in step 350 can additionally also have a classification as dynamic data ("isTemporalTile"=yes) and, if appropriate, a corresponding lifetime. In other words, the at least one attribute can thus comprise a variable or volatile attribute. In some exemplary embodiments, the description of the data types contained in the data format can thus comprise an identification of a variable attribute and a validity duration assigned to the latter.

If dynamic data are among the requested data, the client 120, upon an updating of these data, can be informed of this updating. The head unit 110 in turn can be informed of the updating for example by means of Car2X communication techniques or backend services. In the example shown, in step 360, the head unit 110 informs the client 120 of a change in the attribute 4711 associated with the topology tile 0815, such that if required, in step 370, the client 120 can request the changed attribute data from the head unit 110. Finally, the head unit 110 now upon sends the requested changed attribute data to the client 120.

To summarize, therefore, some exemplary embodiments differentiate between cyclic basic transmission and additional request/response. The cyclic basic transmission can be used to supply the receiver cyclically with relevant basic data requested by the receiver. This includes, in the case of the proposed ADAS protocol, the transmission of the current position and optionally a selection of map attributes that are applicable at the current position. Furthermore, the client has the possibility of directly requesting map information via the requirement-controlled additional request/response interface. Exemplary embodiments can thus achieve a higher flexibility than previously ADAS concepts.

The features disclosed in the description above, the following claims and the accompanying figures may be of importance and implemented both individually and in arbitrary combination for the realization of an exemplary embodiment in the various configurations thereof.

Although some aspects have been described in association with a device, it goes without saying that these aspects also constitute a description of the corresponding method, and so a block or a component of a device should also be understood as a corresponding method step or as a feature of a method step. Analogously thereto, aspects that have been described in association with or as a method step also constitute a description of a corresponding block or detail or feature of a corresponding device.

Depending on specific implementation requirements, exemplary embodiments of the present invention, at least parts thereof, may be implemented in hardware or in software. The implementation may be carried out using a digital storage medium, for example a floppy disk, a DVD, a Blu-Ray disk, a CD, a ROM, a PROM, an EPROM, and EEPROM or a FLASH memory, a hard disk or some other magnetic or optical store on which electronically readable control signals are stored which can interact or interact with a programmable hardware component in such a way that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a single-chip system (SOC=System on Chip), a programmable logic element or a field programmable gate array (FPGA) with a microprocessor.

The digital storage medium may therefore be machine- or computer-readable. Some exemplary embodiments thus comprise a data carrier having electronically readable control signals that are able to interact with a programmable computer system or a programmable hardware component in such a way that one of the methods described herein is carried out. One exemplary embodiment is thus a data carrier (or a digital storage medium or a computer-readable medium) on which the program for carrying out one of the methods described herein is recorded.

Generally, exemplary embodiments of the present invention may be implemented as program, firmware, computer program or computer program product comprising a program code or as data, wherein the program code or the data is or are effective to the extent of carrying out one of the methods when the program runs on a processor or a programmable hardware component. The program code or the data may for example also be stored on a machine-readable carrier or data carrier. The program code or the data may be present, inter alia, as source code, machine code or byte code and as some other intermediate code.

A program in accordance with one exemplary embodiment may implement one of the methods during its performance for example by virtue of the fact that it reads memory locations or writes a datum or a plurality of data thereto, as a result of which possibly switching processes or other processes are brought about in transistor structures, in amplifier structures or in other electrical components, optical components, magnetic components or components that operate according to some other functional principle. Accordingly, by reading a memory location, it is possible for data, values, sensor values or other information to be acquired, determined or measured by a program. A program can therefore acquire, determine or measure variables, values, measurement variables and other information by reading from one or more memory locations and also, by writing to one or more memory locations, can bring about, instigate or carry out an action and also drive other apparatuses, machines and components.

The exemplary embodiments described above merely constitute an illustration of the principles of the present invention. It goes without saying that modifications and variations of the arrangements and details described herein will become apparent to others skilled in the art. Therefore, the intention is that the invention shall be restricted only by the scope of protection of the following patent claims and not by the specific details that have been presented on the basis of the description and the explanation of the exemplary embodiments herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for providing data for a driver assistance system of a motor vehicle, comprising:
communicating, from a navigation unit internal to the motor vehicle to a driver assistance system internal to the motor vehicle, position data, generated by the navigation unit, identifying a position of the motor vehicle;

requesting, by the driver assistance system, which uses the position information in providing one or more driver assistance functions, additional information from the navigation unit, in response to receiving the position data and based on a determination that the driver assistance system requires additional information with respect to the position data to provide the one or more driver assistance functions; and communicating, in response to said requesting, the additional information from the navigation unit to the driver assistance system.

2. The method as claimed in claim 1, wherein said communicating position data is carried out periodically.

3. The method as claimed in claim 2, wherein requesting additional information comprises requesting map information of a digital road map, wherein the map information is associated with the position data.

4. The method as claimed in claim 3, wherein the map information comprises attributes and/or topological data associated with the position data.

5. The method as claimed in claim 1, wherein requesting additional information comprises requesting topological data associated with the position data.

6. The method as claimed in claim 1, wherein communicating additional information comprises communicating topological data from map tiles of a digital road map that are associated with the position data.

7. The method as claimed in claim 5, wherein requesting additional information further comprises requesting at least one attribute associated with the topological data, and wherein the method further comprises communicating, in response to said requesting additional information, the at least one attribute from the navigation unit to the driver assistance system.

8. The method as claimed in claim 7, wherein communicating the at least one attribute is carried out in a data format adapted to the attribute.

9. The method as claimed in claim 8, wherein the data format comprises a unique identification of the data format and a description of data types contained in the data format.

10. The method as claimed in claim 7, wherein the at least one attribute comprises a variable attribute.

11. The method as claimed in claim 9, wherein the description of the data types contained in the data format comprises an identification of a variable attribute and a validity duration assigned to the variable attribute.

12. The method as claimed in claim 9, further comprising: informing the driver assistance system about a changed attribute.

13. The method as claimed in claim 11, wherein said requesting at least one attribute comprises re-requesting the at least one attribute after a validity duration thereof has expired.

14. The method as claimed in claim 12, wherein said requesting at least one attribute comprises re-requesting the at least one attribute after a validity duration thereof has expired.

15. The method as claimed in claim 1, wherein communicating, in response to said requesting, the additional information from the navigation unit to the driver assistance system comprises communicating between the navigation unit and the driver assistance system via a vehicle-internal bus system.

16. The method as claimed in claim 1, wherein communicating the position data comprises exclusively communicating the position data, and wherein communicating the additional information comprises exclusively communicating map information.

17. A system configured to provide data for a driver assistance system of a motor vehicle, comprising:
at least one driver assistance system internal to the motor vehicle, configured to:
receive position data from a navigation unit internal to the motor vehicle identifying a position of the motor vehicle, the position data being generated by the navigation unit,
provide one or more driver assistance functions based on at least the position data, and
request additional information from the navigation unit in response to receiving the position data and based on a determination that additional information with respect to the position data is required to provide the one or more driver assistance functions.

18. The system as claimed in claim 17, further comprising:
the navigation unit configured to communicate the additional information to the driver assistance system in response to the request for additional information from the driver assistance system.

* * * * *